US012235358B2

United States Patent
Kim et al.

(10) Patent No.: US 12,235,358 B2
(45) Date of Patent: Feb. 25, 2025

(54) METHOD AND CAMERA MODULE FOR ACQUIRING DEPTH INFORMATION

(71) Applicant: LG INNOTEK CO., LTD., Seoul (KR)

(72) Inventors: Chul Kim, Seoul (KR); Hyeong Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1009 days.

(21) Appl. No.: 17/279,257

(22) PCT Filed: Oct. 7, 2019

(86) PCT No.: PCT/KR2019/013135
§ 371 (c)(1),
(2) Date: Mar. 24, 2021

(87) PCT Pub. No.: WO2020/071885
PCT Pub. Date: Apr. 9, 2020

(65) Prior Publication Data
US 2022/0057508 A1    Feb. 24, 2022

(30) Foreign Application Priority Data

Oct. 5, 2018    (KR) .................. 10-2018-0119342

(51) Int. Cl.
*G01S 17/08*    (2006.01)
*H04N 13/254*    (2018.01)
(Continued)

(52) U.S. Cl.
CPC .......... *G01S 17/08* (2013.01); *H04N 13/254* (2018.05); *H04N 13/271* (2018.05); *H04N 13/296* (2018.05)

(58) Field of Classification Search
CPC .... G01S 7/4811; G01S 7/4814; G01S 7/4815; G01S 7/4817; G01S 7/484; G01S 17/08;
(Continued)

(56) References Cited

U.S. PATENT DOCUMENTS 6,708,003 B1 *   3/2004   Wickham ........... H04B 10/1121
                                                      398/161
7,724,994 B1 *   5/2010   Pepper ................ H01Q 3/2676
                                                      385/27
(Continued)

FOREIGN PATENT DOCUMENTS

KR    10-2012-0134223 A    12/2012
KR    10-2015-0139831 A    12/2015
(Continued)

OTHER PUBLICATIONS

J. Wang, P. Hou, H. Cai, J. Sun, S. Wang, L. Wang and F. Yang, "Continuous angle steering of an optically controlled phased array antenna based on differential true time delay constituted by micro-optical components", Apr. 3, 2015, Optics Express, vol. 23, No. 7, p. 1-8 (Year: 2015).*

*Primary Examiner* — Yuqing Xiao
*Assistant Examiner* — Benjamin Richard Hebert
(74) *Attorney, Agent, or Firm* — Birch, Stewart, Kolasch & Birch, LLP

(57) ABSTRACT

Disclosed according to an embodiment is a method for controlling emitted light in a camera module which can acquire depth information. More particularly, disclosed is a camera module for controlling delay time of light emitted from each of light sources to determine the direction of light emitted from the light sources. A camera module according to an embodiment may control delay time of light emitted from each of light sources so that the camera module can be operated with higher performance even from a long distance.

17 Claims, 16 Drawing Sheets

(51) Int. Cl.
*H04N 13/271* (2018.01)
*H04N 13/296* (2018.01)

(58) Field of Classification Search
CPC .... G01S 17/10; H04N 13/254; H04N 13/271; H04N 13/296
See application file for complete search history.

(56) References Cited

U.S. PATENT DOCUMENTS

| | | | | |
|---|---|---|---|---|
| 2002/0181874 | A1* | 12/2002 | Tulchinsky | H01Q 3/2676 |
| | | | | 385/24 |
| 2007/0181810 | A1* | 8/2007 | Tan | G01S 7/4811 |
| | | | | 250/341.1 |
| 2016/0069999 | A1 | 3/2016 | Lee et al. | |
| 2016/0124089 | A1* | 5/2016 | Meinherz | G01S 17/894 |
| | | | | 356/5.01 |
| 2017/0070023 | A1* | 3/2017 | Umeda | B23K 26/00 |
| 2017/0090031 | A1 | 3/2017 | Bondy et al. | |
| 2018/0031680 | A1 | 2/2018 | Lee et al. | |
| 2018/0189977 | A1 | 7/2018 | Zecchini et al. | |
| 2018/0321569 | A1* | 11/2018 | Spector | G02F 1/125 |
| 2019/0025509 | A1* | 1/2019 | Kim | G01S 17/36 |
| 2019/0227169 | A1* | 7/2019 | Wong | G01S 17/89 |

FOREIGN PATENT DOCUMENTS

| | | |
|---|---|---|
| KR | 10-2018-0013598 A | 2/2018 |
| WO | WO 93/07530 A1 | 4/1993 |

* cited by examiner

| $3\phi$ | $3\phi$ | $3\phi$ | $3\phi$ |
|---|---|---|---|
| $3\phi$ | $\phi$ | $\phi$ | $3\phi$ |
| $3\phi$ | $\phi$ | $\phi$ | $3\phi$ |
| $3\phi$ | $3\phi$ | $3\phi$ | $3\phi$ |

|  |  |  |  |  |
|---|---|---|---|---|
| 5φ | 5φ | 5φ | 5φ | 5φ |
| 5φ | 3φ | 3φ | 3φ | 5φ |
| 5φ | 3φ | φ | 3φ | 5φ |
| 5φ | 3φ | 3φ | 3φ | 5φ |
| 5φ | 5φ | 5φ | 5φ | 5φ |

1100
1141
1142
1143

1100

METHOD AND CAMERA MODULE FOR ACQUIRING DEPTH INFORMATION

CROSS REFERENCE TO RELATED APPLICATIONS

This application is the National Phase of PCT International Application No. PCT/KR2019/013135, filed on Oct. 7, 2019, which claims priority under 35 U.S.C. 119(a) to Patent Application No. 10-2018-0119342, filed in the Republic of Korea on Oct. 5, 2018, all of which are hereby expressly incorporated by reference into the present application.

TECHNICAL FIELD

The present disclosure relates to a method and a camera module for acquiring depth information.

BACKGROUND ART

Devices that obtain information by outputting light and reflecting it on an object have been used in various fields. For example, from 3D cameras to distance measurement techniques, technologies for obtaining information by outputting light are being used in several ways.

For example, time of flight (ToF) is a term representing the principle of measuring the distance by measuring the time difference between the time when the light is outputted and the time of reception of the received light reflected and returned from an object, and since implementation method of TOF technology is simple, it is used in various fields such as aviation, shipbuilding, civil engineering, cameras, surveying, and the like. In addition, a specific method of controlling the light being outputted is required in this regard.

DETAILED DESCRIPTION OF THE INVENTION

Technical Subject

The present disclosure may provide a method for obtaining depth information and a camera module using the same according to one or more embodiments.

Specifically, a method and a camera module for determining the direction of light outputted from a light source array are disclosed. The technical problem to be solved is not limited to the technical problems as described above, and various technical problems may be further included within a scope that is obvious to a person skilled in the art.

Technical Solution

A camera module according to the first aspect comprises: a light source array that outputs light to an object through light sources; a receiver for receiving light reflected from the object; and a processor that acquires(obtains) depth information on the object by using a phase difference between the light outputted from the light source array and the light received by the receiver, wherein the processor controls delay time of light outputted from each of the light sources, so that the direction of light outputted through the light sources can be determined.

In addition, the processor determines the delay time of the light outputted from the light sources located in a central region of the light sources to be smaller than the delay time of the light outputted from the light sources located in a peripheral region of the light sources, so that the direction of the light can be determined to be directing toward the central direction.

In addition, the processor determines the delay time of light outputted from the light sources located in a second region of the light sources to be smaller than the delay time of light outputted from the light sources located in a first region of the light sources, so that the direction of the light can be determined to be directing toward the direction in which the first region is located.

In addition, the processor may determine the distance from the light source array to the object, and when the distance is less than or equal to a preset value, the processor may determine the delay time of light outputted from each of the light sources to be the same.

In addition, the processor may determine the distance from the light source array to the object, and when the distance exceeds a preset value, the processor may determine the delay time for each light outputted from each of the light sources to be different.

A camera module according to the second aspect comprises: a light source array that outputs light to an object through light sources; a receiver for receiving light reflected from the object; and a processor that obtains depth information on the object by using a difference a time point at which the light source array outputs light and a time point at which the receiver receives the light, wherein the processor may determine the direction of light outputted through the light sources by controlling the delay time of a light source outputted from each of the light sources.

A method for obtaining depth information according to a third aspect comprises the steps of: determining the direction of light outputted from a light source array; determining the delay time of light outputted from each of the light sources included in the light source array according to the directing direction; outputting light having different delay times toward an object through the light sources according to the determined delay time; receiving the light reflected from the object through a receiver; and obtaining depth information on the object by using the phase difference between the light outputted from the light source array and the light received by the receiver.

A method for obtaining depth information according to a fourth aspect comprises the steps of: determining the direction of light outputted from a light source array; determining the delay time of light outputted from each of the light sources included in the light source array according to the directing direction; outputting light having different delay times toward an object through the light sources according to the determined delay time; receiving the light reflected from the object through a receiver; and obtaining depth information on the object by using the difference between the time point at which the light source array outputs light and the time point at which the receiver receives the light.

The fifth aspect may provide a computer-readable recording medium in which a program for executing a method according to the third aspect or the fourth aspect on a computer is recorded.

Advantageous Effects

The present disclosure may provide a method for obtaining depth information and a camera module using the same according to one or more embodiments.

Specifically, a method and a camera module for determining a direction of light outputted from a light source array are disclosed.

BRIEF DESCRIPTION OF DRAWINGS

FIG. 8 is a diagram illustrating an example in which a light source array according to an embodiment outputs light so that energy is concentrated in a central region on a 2D area of 4*4 pixels.

FIG. 9 is a diagram illustrating an example in which a light source array according to an embodiment outputs light so that energy is concentrated in a central region on a 2D area of 5*5 pixels.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected", "coupled", or "jointed" to another component, the component may be directly connected, coupled, or jointed to the other component, however, it should be understood that another element may be "connected", "coupled" or "jointed" between components.

In addition, when described as being formed or arranged in "on (above)" or "below (under)" of each component, "on (above)" or "below (under)" means that it includes not only the case where the two components are directly in contact with, but also the case where one or more other components are formed or disposed between the two components. In addition, when expressed as "upper (upper)" or "lower (lower)", the meaning of not only an upward direction but also a downward direction based on one component may be included.

In addition, the numerical values described below may be interpreted as values within a reasonable range according to errors. For example, a number written as "1" can be interpreted as "1.01".

Hereinafter, embodiments of the present invention will be described in detail with reference to the drawings.

Figure 1:
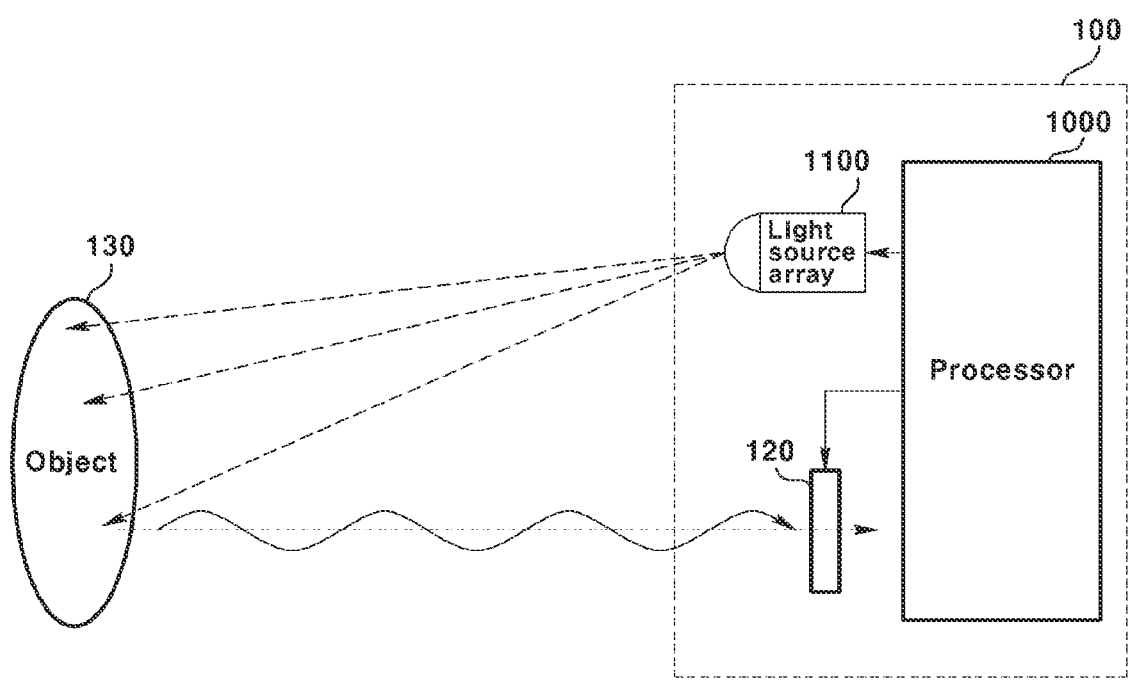
FIG. 1 is a block diagram illustrating a configuration and operation of a camera module according to an embodiment.

FIG. 1 is a block diagram illustrating a configuration and operation of a camera module 100 according to an embodiment.

As illustrated in FIG. 1, the camera module 100 may include a light source array 1100, a processor 1000, and a receiver 120.

However, it can be understood by a person skilled in the art that other general purpose components other than the components illustrated in FIG. 1 may be further included in a camera module 100. For example, the camera module 100 may further include a diffuser through which light outputted from the light source array passes, an optical modulator (not shown) included in the light source array 1100, or a memory (not shown) connected to the processor 1000. The term "memory" can be broadly interpreted to include any electronic component capable of storing electronic information. The term memory may refer to various types of processor-readable media such as a random access memory (RAM), a read-only memory (ROM), a non-volatile random access memory (NVRAM), a programmable read-only memory (PROM), an electrically erasable PROM (EEPROM), flash memory, magnetic or optical data storage, registers, and the like. The memory is said to be in electronic communication with the processor if the processor 1000 can read information from the memory and/or write information to the memory. The memory integrated in the processor 1000 is in electronic communication with the processor.

In addition, memory may include at least one type of storage medium among a flash memory type, a hard disk type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk.

Alternatively, according to another embodiment, it may be understood by a person skilled in the art that some of the components illustrated in FIG. 1 may be omitted.

The light source array 1100 according to an embodiment may output light. The light outputted from the light source array 1100 may be a wavelength within a preset range.

The light source array 1100 may be, for example, a light emitting diode (LED) or laser diode (LD) capable of emitting light having an infrared wavelength, and light having a near-infrared (NIR) wavelength of about 850 nm, which is not visible to the human eye for safety, but the wavelength band and the type of light source array are not limited. For example, the wavelength of light outputted from the light source array 1100 may be included in the visible region or the ultraviolet region.

The light source array 1100 may output light, for example, by performing amplitude modulation or phase modulation according to the control signal received from the processor 1000. The light outputted from the light source array 1100 to the object 130 according to the control signal of the processor 1000 may have a form of a periodic continuous function having a preset period. For example, the light may have a specially defined waveform such as a sine wave, a ramp wave, a square wave, or a pulse wave, but may have a general shape that is not defined.

The receiver 120 may receive light reflected from an object 130. The camera module 100 may obtain various pieces of information through the received light received by the receiver 120.

A camera module 100 according to an embodiment may obtain information on an object 130 through the received light. For example, the processor 1000 may obtain information about the object such as the shape, size, color, depth of the object 130, and the like.

The receiver 120 may distinguish a received light obtained by reflecting the light outputted from the light source array 1100 to an object 130 among various lights entering the receiver 120. For example, the receiver 120 may selectively obtain light in the range of 750 nm to 950 nm through filtering when the light source array 1100 outputs light in the range of 750 nm to 950 nm. In addition, the receiver 120 may obtain accurate information about the object 130 by selectively obtaining received light corresponding to the light.

Since the camera module 100 according to an embodiment can extract depth information using the ToF function, it may be understood interchangeably with ToF camera module or ToF module in the present disclosure.

The light source array 1100 may generate light to be outputted and irradiate the object 130 with it. In this case, the light source array 1100 may generate and output light in the form of a pulse wave or a continuous wave. The continuous wave may be in the form of a sinusoid wave or a square wave. By generating light in the form of a pulse wave or a continuous wave, the camera module 100 may determine a phase difference between the light outputted from the light source array 1100 and the light reflected from the object and then received by the camera module 100.

The light source array 1100 may irradiate the generated light onto the object 130 during a preset exposure period. The exposure period may mean one frame period. In the case of generating a plurality of frames, a set exposure period may be repeated. For example, when the camera module 100 photographs an object at 20 FPS, the exposure period is ½0 second. In addition, when 100 frames are generated, the exposure period may be repeated 100 times.

The light source array 1100 may generate a plurality of lights having different frequencies. The light source array 1100 may sequentially and repeatedly generate a plurality of lights having different frequencies. Alternatively, the light source array 1100 may simultaneously generate a plurality of lights having different frequencies.

The light source array 1100 according to an embodiment may output light to an object 130 through a plurality of light sources. The light source array 1100 may include a plurality of light sources, and each of the plurality of light sources may independently output light. For example, a plurality of light sources can output light of different intensities, can output light of different frequencies, can output light of different phases, and output light having different delay times. Each of the plurality of light sources may include a light emitting diode.

The receiver 120 according to an embodiment may receive light through receiving pixels. The receiver 120 may receive a reflected light being obtained as the light outputted from the light source array 1100 is reflected from the object 130. The receiver 120 may include receiving pixels and each of the receiving pixels may receive light independently of one another. For example, receiving pixels may receive light at different timings and may receive light using different filtering methods.

The receiver 120 according to an embodiment may include a lens (not shown) and an image sensor. The lens may collect light reflected from the object 130 and transmit it to an image sensor (not shown). The image sensor may receive light and generate an electrical signal corresponding to the received light.

According to an embodiment, the light source array 1100 may output light of a different frequency over time. For example, the light source array 1100 may output light with a frequency $f_1$ during the first half of the exposure period, and output light with a frequency $f_2$ during the other half of the exposure period.

According to an embodiment, some of the plurality of light emitting diodes included in the light source array 1100 may output light having a frequency $f_1$, and other light emitting diodes may output light having a frequency $f_1$.

In order to control a plurality of light emitting diodes included in the light source array 1100, the light source array 1100 may include a light modulator.

The light source array 1100 may generate light. The light generated by the light source array 1100 may be infrared rays having a wavelength of 770 to 3000 nm, or visible light having a wavelength of 380 to 770 nm. The light source array 1100 may use light emitting diodes (LED), and may have a shape in which a plurality of light emitting diodes are arranged according to a predetermined pattern. The light source array 1100 may include an organic light emitting diode (OLED) or a laser diode (LD). Alternatively, the light source array 1100 may be a vertical cavity surface emitting laser (VCSEL). The VCSEL is one of laser diodes that converts electrical signals into light, and may use a wavelength of about 800 to 1000 nm, for example, about 850 nm or about 940 nm.

The light source array 1100 may repeatedly blink (on/off) at predetermined time intervals and generate light in the form of a pulse wave or a continuous wave. The predetermined time interval may be the frequency of the light. Blinking of the light source array 1100 may be controlled by an optical modulator.

The optical modulator may control blinking of the light source array 1100 to control the light source array 1100 to generate light in the form of a continuous wave or a pulse wave. The optical modulator may control the light source array 1100 to generate light in the form of a continuous wave or a pulse wave through frequency modulation or pulse modulation, or the like.

The processor 1000 according to an embodiment may obtain depth information on the object 130 by using a phase difference between the light outputted from the light source array 1100 and the light received by the receiver 120. The receiver 120 may generate an electric signal corresponding to each reference signal by using a plurality of reference signals having different phase differences. The frequency of the reference signal may be determined equal to the frequency of light outputted from the light source array 1100. Accordingly, when the light source array 1100 generates light with a plurality of frequencies, the receiver 120 may generate an electric signal using a plurality of reference signals corresponding to each frequency. The electrical signal may include information on the amount of charge or the voltage corresponding to each reference signal.

The number of reference signals according to an embodiment may be four, $C_1$ to $C_4$. Each of the reference signals $C_1$ to $C_4$ may have the same frequency as the light outputted from the light source array 1100, but may have a 90-degree phase difference from one another. One of the four reference signals $C_1$ may have the same phase as the light outputted from the light source array 1100. The light obtained by being reflected from the object 130 may be delayed in phase by a distance from which the light outputted from the light source array 1100 is reflected from the object 130 and returned. The receiver 120 may generate signals $Q_1$ to $Q_4$ for each reference signal by mixing the received light and each reference signal, respectively.

The receiver 120 may include an image sensor configured in a structure in which a plurality of pixels is arranged in the form of a grid. The image sensor may be a complementary metal oxide semiconductor (CMOS) image sensor, or may be a charge coupled device (CCD) image sensor. In addition, the image sensor may include a ToF sensor that receives infrared light reflected from an object and measures a distance using time or phase difference.

Specifically, the processor 1000 may calculate a phase difference between the output light and the input light using information on the amount of charge of the electric signal.

As described above, four electrical signals may be generated for each frequency of light outputted from the light source array 1100. Accordingly, the processor 1000 may determine a phase difference $t_d$ between the light outputted from the light source array 1100 and the light received by the receiver 120 by using Equation 1 below.

$$t_d = \arctan\left(\tan\left(\frac{Q_3 - Q_4}{Q_1 - Q_2}\right)\right) \quad \text{[Equation 1]}$$

Here, $Q_1$ to $Q_4$ may be a charge amount of each of the four electric signals. $Q_1$ is the amount of the electric charge of the electric signal corresponding to the reference signal of the same phase as the light outputted from the light source array 1100, $Q_2$ is the amount of the electric charge of the electric signal corresponding to the reference signal having a phase lagging 180 degrees behind the light outputted from the light source array 1100, $Q_3$ is the amount of the electric charge of the electric signal corresponding to the reference signal having a phase lagging 90 degrees behind the light outputted from the light source array 1100, and $Q_4$ may be the amount of the electric charge of the electric signal corresponding to the reference signal having a phase lagging 270 degrees behind the light outputted from the light source array 1100.

Then, the processor 1000 may determine the distance between the object 130 and the camera module 100 using the phase difference between the light outputted from the light source array 1100 and the light received by the receiver 120. In this case, the processor 1000 according to an embodiment may determine the distance d between the object 130 and the camera module 100 using Equation 2.

$$d = \frac{c}{2f} \frac{t_d}{2\pi} \quad \text{[Equation 2]}$$

Here, c is the speed of light, and f may be the frequency of the output light.

According to an embodiment, a ToF IR image and a depth image may be obtained from the camera module 100.

The processor 1000 according to an embodiment may obtain depth information on an object 130 by using a difference the time point at which the light source array 1100 outputs light and the time point at which the receiver 120 receives the light. The light source array 1100 may obtain depth information by outputting light such as a laser or infrared light toward the object 130, receiving reflected and returned light, and calculating a time difference.

Figure 2:
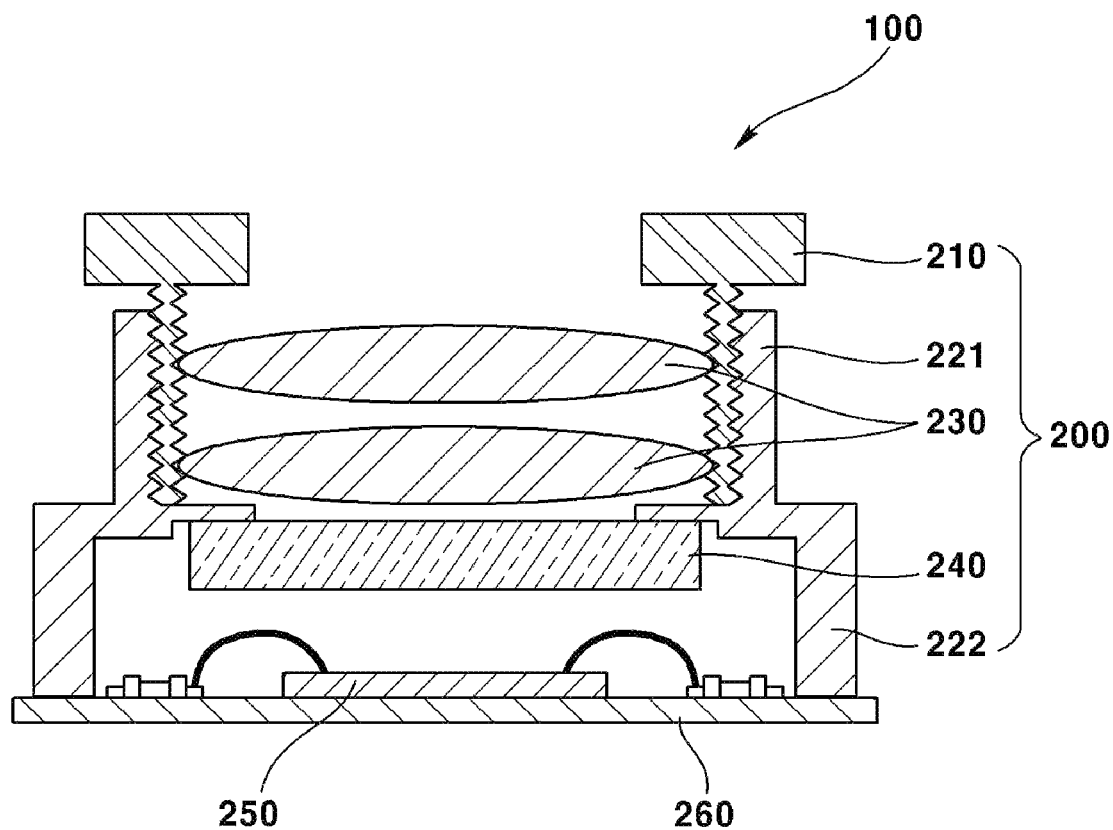
FIG. 2 is a cross-sectional view of a camera module according to an embodiment.

FIG. 2 is a cross-sectional view of a camera module 100 according to an embodiment.

Referring to FIG. 2, the camera module 100 includes a lens assembly 200, an image sensor 250, and a printed circuit board 260. The processor 1000 of FIG. 1 and the like may be implemented within the printed circuit board 260. Although not illustrated, the light source array 1100 of FIG. 1 is disposed on a side surface of the image sensor 250 on the printed circuit board 260 or it may be disposed outside the camera module 100, for example, on a side surface of the camera module 100, but is not limited thereto.

The lens assembly 200 may include a lens 230, a lens barrel 210, lens holders 221 and 222, and an IR filter 240.

The lens 230 may be composed of a plurality of pieces, or may be composed of one piece. When the lens 230 is formed of a plurality of pieces, each of the lenses may be aligned with respect to the central axis to form an optical system. Here, the central axis may be the same as the optical axis of the optical system.

The lens barrel 210 is coupled to the lens holders 221 and 222, and a space for accommodating lenses may be provided therein. The lens barrel 210 may be rotationally coupled with one or a plurality of lenses, but this is exemplary, and it may be coupled in other ways, such as a method using an adhesive (for example, an adhesive resin such as epoxy).

The lens holders 221 and 222 may be coupled to the lens barrel 210 to support the lens barrel 210, and may be coupled to the printed circuit board 260 on which the image sensor 250 is mounted. A space in which the IR filter 240 can be attached may be formed under the lens barrel 210 by the lens holders 221 and 222. A spiral pattern may be formed on an inner circumferential surface of the lens holders 221 and 222, and similarly, the lens barrel 210 having a spiral pattern formed on an outer circumferential surface may be coupled by rotation. However, this is exemplary, and the lens holders 221 and 222 and the lens barrel 210 may be coupled through an adhesive, or the lens holders 221 and 222 and the lens barrel 210 may be integrally formed.

The lens holders 221 and 222 may be divided into an upper holder 221 coupled to the lens barrel 210 and a lower holder 222 coupled to the printed circuit board 260 on which the image sensor 250 is mounted, The upper holder 221 and the lower holder 222 may be integrally formed, formed in a structure separated from each other, and then fastened or combined, or may have a structure separated from each other and spaced apart from each other. In this case, the diameter of the upper holder 221 may be formed to be smaller than the diameter of the lower holder 222, but is not limited thereto.

The above example is only an embodiment, and the lens 230 may be configured with another structure capable of collimating light incident on the camera module 100 and delivering it to the image sensor 250.

The image sensor 250 may generate an electrical signal by using the light collimated through the lens 230.

The image sensor 250 may detect input light in synchronization with the blinking period of the light source array 1100. Specifically, the image sensor 250 may detect the light outputted from the light source array 1100 at in-phase and out-phase, respectively. That is, the image sensor 250 may repeatedly perform a step of absorbing light when the light source array 1100 is turned on and a step of absorbing light when the light source array 1100 is turned off.

The image sensor 250 may generate an electric signal corresponding to each reference signal by using a plurality of reference signals having different phase differences. The frequency of the reference signal may be determined equal to the frequency of light outputted from the light source array 1100. Therefore, when the light source array 1100 generates light with a plurality of frequencies, the image sensor 250 may generate an electric signal using a plurality of reference signals corresponding to each frequency. The electrical signal may include information on an amount of charge or voltage corresponding to each reference signal.

The processor 1000 according to an embodiment may control delay time of light outputted from each of the plurality of light sources, and may determine a direction of light outputted through the plurality of light sources. Hereinafter, an embodiment in which the processor 1000 determines a direction of light by controlling delay time is illustrated.

Figure 3:
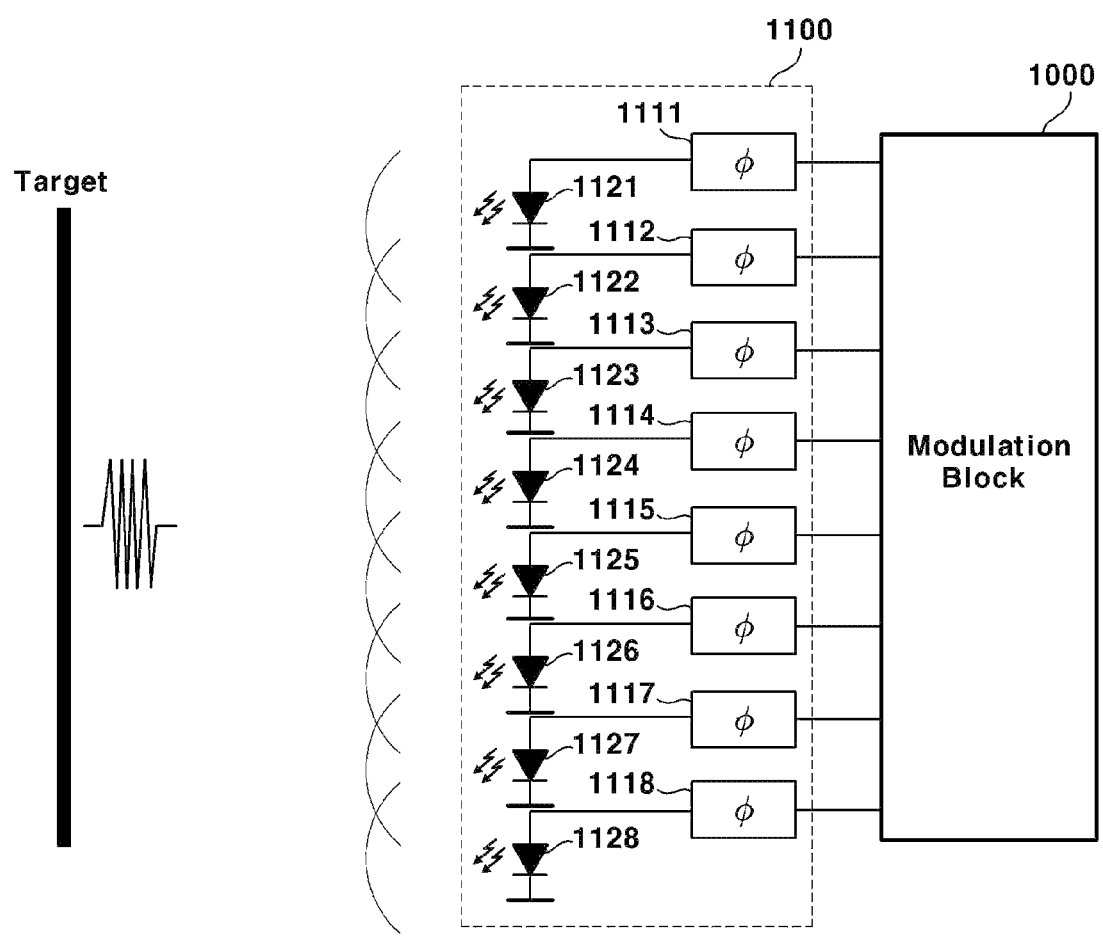
FIG. 3 is a diagram illustrating an example in which a light source array according to an embodiment outputs light without difference in delay time.

FIG. 3 is a diagram illustrating an example in which a light source array 1100 according to an embodiment outputs light without difference in delay time.

Referring to FIG. 3, a light source array 1100 according to an embodiment may include a plurality of light emitting diodes 1121 to 1128. In FIG. 3, eight light emitting diodes 1121 to 1128 are disclosed for convenience of description, but the number or arrangement method thereof is not limited.

The plurality of light emitting diodes 1121 to 1128 may be disposed in the form of an array. Referring to FIG. 3, a plurality of light emitting diodes 1121 to 1128 is disposed in a line, but it is not limited thereto. For example, a plurality of light emitting diodes 1121 to 1128 may be disposed on a plane.

When a control signal is applied to each of the plurality of light emitting diodes 1121 to 1128, a time delay by the value indicated in each of the blocks 1111 to 1118 may occur. Referring to FIG. 3, a time delay equal to 0 occurs in all of the plurality of light emitting diodes 1121 to 1128. The plurality of light emitting diodes 1121 to 1128 all have the same time delay by ø, so that the plurality of light emitting diodes 1121 to 1128 can all output light at the same time. When all of the plurality of light emitting diodes 1121 to 1128 output light at the same time, light outputted from the light source array 1100 is directed to the front, and in this case, special energy concentration may not appear in the light outputted from the light source array 1100.

The processor 1000 according to an embodiment may determine a distance from the light source array 1100 to the object 130, and when the determined distance is less than or equal to a preset value, delay time of light outputted from each of the light sources may be determined to be the same. When the delay time of light outputted from each of the light sources is the same, the light may be outputted as shown in FIG. 3. When the distance from the light source array 1100 to the object 130 is sufficiently close, since there is no need to specifically concentrate light energy, the light source array 1100 may be operated as shown in FIG. 3 according to the control of the processor 1000.

The processor 1000 according to another embodiment determines the distance from the light source array 1100 to the object 130, and when the determined distance exceeds a preset value, the delay time of light outputted from each of the light sources may be determined to be different. Examples in which the delay time of the light outputted from each of the light sources is different are disclosed in FIGS. 4 to 11.

Figure 4:
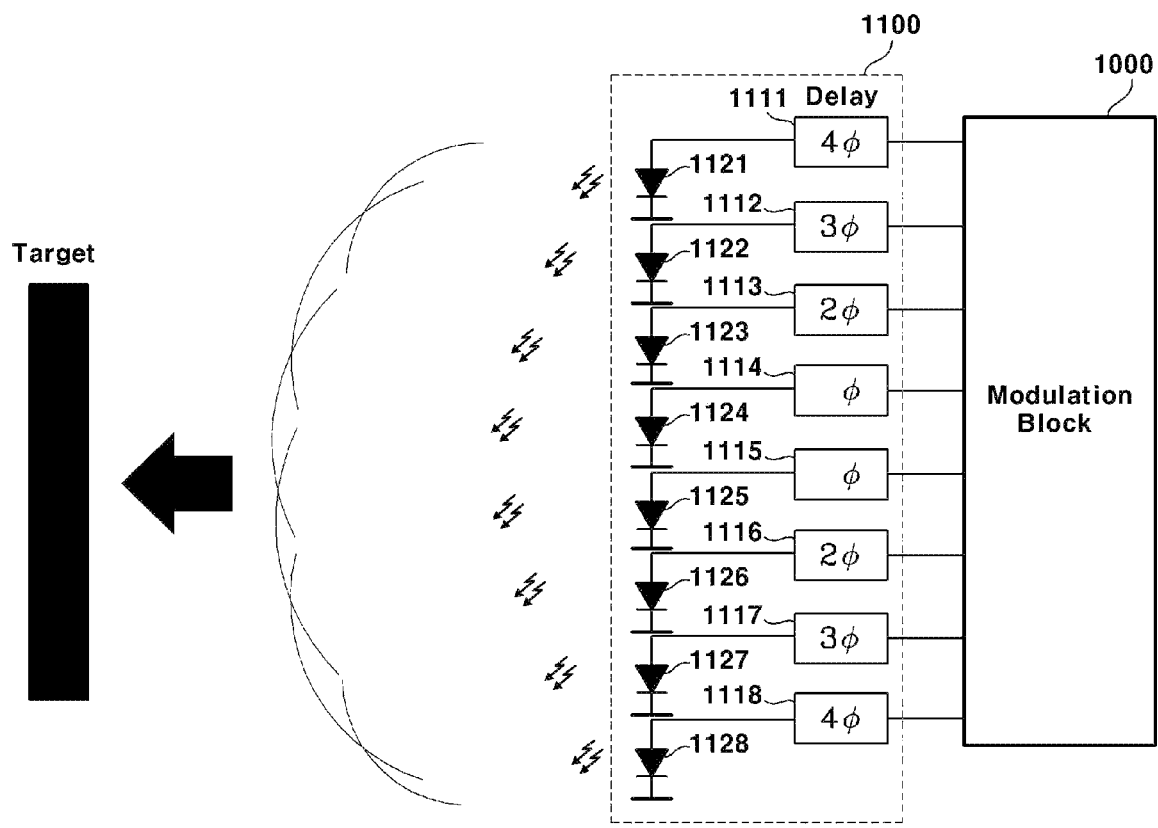
FIG. 4 is a diagram illustrating an example in which a processor according to an embodiment controls delay time to output light in the shape close to a circle so that energy is concentrated in the central region.

FIG. 4 is a diagram illustrating an example in which a processor 1000 according to an embodiment controls delay time to output light in the shape close to a circle so that energy is concentrated in the central region.

When a control signal is applied to each of the plurality of light emitting diodes 1121 to 1128, a time delay by the value indicated in each of the blocks 1111 to 1118 may occur. Referring to FIG. 4, time delays of 4ø, 3ø, 2ø, 1ø, 1ø, 2ø, 3ø, and 4ø may occur in the plurality of light emitting diodes 1121 to 1128, respectively.

According to the time delay applied to the plurality of light emitting diodes 1121 to 1128, the light outputted from the light source array 1100 is directed to the front, and in this case, in the light outputted from the light source array 1100, energy concentration in the central region may appear.

Referring to FIG. 4, the processor 1000 applies a control signal to a plurality of light emitting diodes 1121 to 1128 to generate a time delay of 4ø, 3ø, 2ø, 1ø, 1ø, 2ø, 3ø, 4ø, respectively, so that light may be outputted in the shape close to a circle so that energy is concentrated in the central region.

Figure 5:
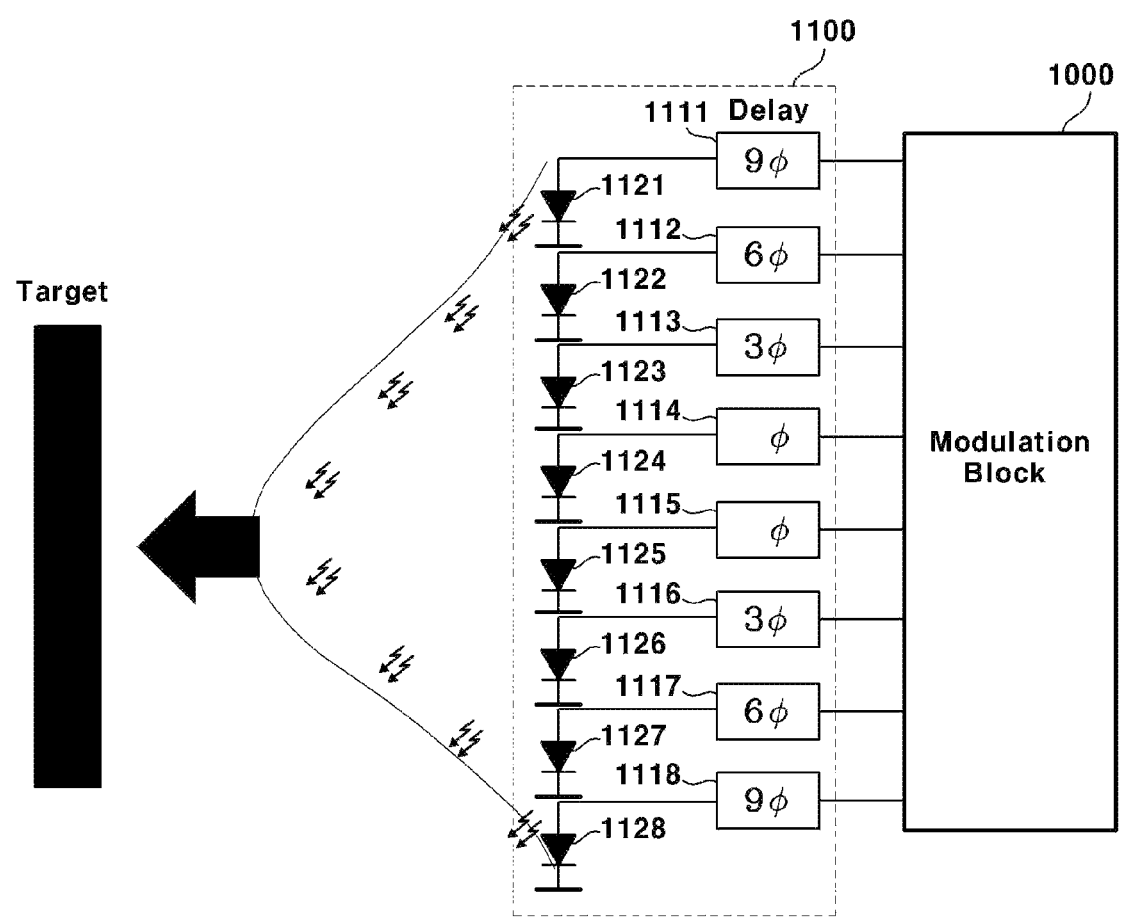
FIG. 5 is a diagram illustrating an example in which a processor according to an embodiment controls delay time to output light in the shape close to a curve so that energy is concentrated in the central region.

FIG. 5 is a diagram illustrating an example in which a processor 1000 according to an embodiment controls delay time to output light in the shape close to a curve so that energy is concentrated in the central region.

The processor determines the delay time of the light outputted from the light sources located in a central region of the light sources to be smaller than the delay time of the light outputted from the light sources located in a peripheral region of the light sources, so that the direction of the light can be determined to be directing toward the central direction. Each of the light sources may include a light emitting diode. Specifically, the light sources may be implemented with a plurality of light emitting diodes 1121 to 1128.

When a control signal is applied to each of the plurality of light emitting diodes 1121 to 1128, a time delay by the value indicated in each of the blocks 1111 to 1118 may occur. Referring to FIG. 5, time delays of 9ø, 6ø, 3ø, 1ø, 1ø, 3ø, 6ø, and 9ø may occur in the plurality of light emitting diodes 1121 to 1128, respectively.

According to the time delay applied to the plurality of light emitting diodes 1121 to 1128, the light outputted from the light source array 1100 is directed to the front, and in this case, energy concentration in the central region may appear in the light outputted from the light source array 1100.

Referring to FIG. 5, the processor 1000 applies a control signal to a plurality of light emitting diodes 1121 to 1128 to generate a time delay of 9ø, 6ø, 3ø, 1ø, 1ø, 3ø, 6ø, 9ø, respectively, and light may be outputted in the shape close to a curve so that energy is concentrated in the central region.

The camera module 100 may output modulated light from the LED (VCSEL) of the light source array 1100, and the output light is reflected by an object and received, thereby determining a distance corresponding to the movement time. As the distance between the camera module 100 and the object increases, the light reflected from the object and received weakens, and the influence of the disturbance increases, so that accuracy may decrease. However, when light is outputted in a way that energy is concentrated in the central region as shown in FIG. 4 or 5, the camera module 100 may obtain more accurate depth information for a long distance, even though the camera module 100 is implemented with the same hardware.

Accordingly, a problem in that the light output of the light source array 1100 (e.g., LED) decreases over a long distance can be solved. When the light source array 1100 includes a plurality of light emitting diodes 1121 to 1128 disposed in an array format, by controlling delay time for light outputted from the several light emitting diodes 1121 to 1128, and beam forming the light outputted from the light source array 1100 so that the energy of the light outputted can be concentrated to a specific direction or a specific location. Accordingly, the light source array 1100 may more accurately obtain depth information for a long distance with low power under the same hardware condition.

In addition, the camera module 100 may be used in various devices requiring depth information such as a rear camera of a mobile phone, a forward camera of a vehicle, a rear camera of a vehicle, and the like.

Figure 6:
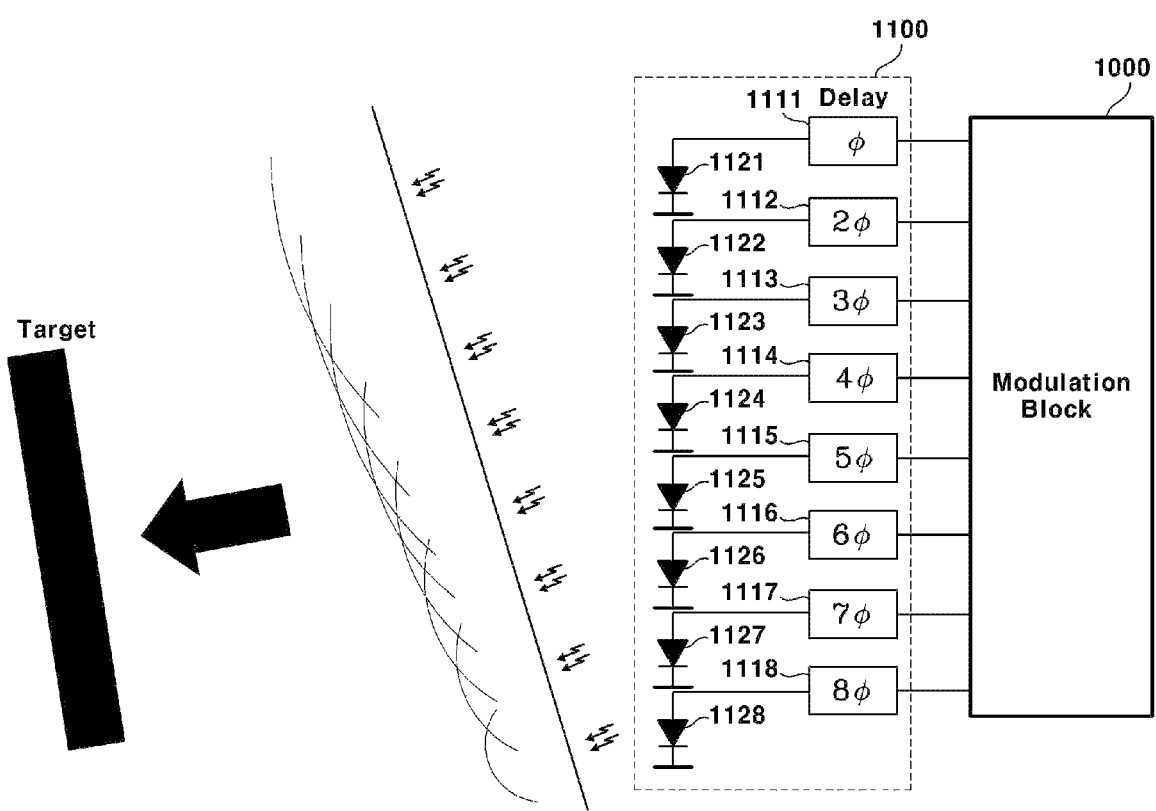
FIG. 6 is a diagram illustrating an example in which a processor according to an embodiment determines a direction of light to be left direction and outputs light.

FIG. 6 is a diagram illustrating an example in which a processor 1000 according to an embodiment determines a direction of light to be left side direction and outputs light.

The processor 1000 determines the delay time of light outputted from the light sources located in a second region of the light sources to be smaller than the delay time of light output from the light sources located in a first region of the light sources, so that the direction of the light can be determined to be directing toward the direction in which the first region is located.

Referring to FIG. 6, the processor 1000 may determine the direction of light to be left direction based on the direction of light output by determining the delay time in a way that among the plurality of light emitting diodes 1121 to 1128, the delay time of the light emitted from the light emitting diode located on the left side based on the light output direction is determined to be larger than the delay time of the light emitted from the light emitting diode located on the right side based on the light output direction.

Figure 7:
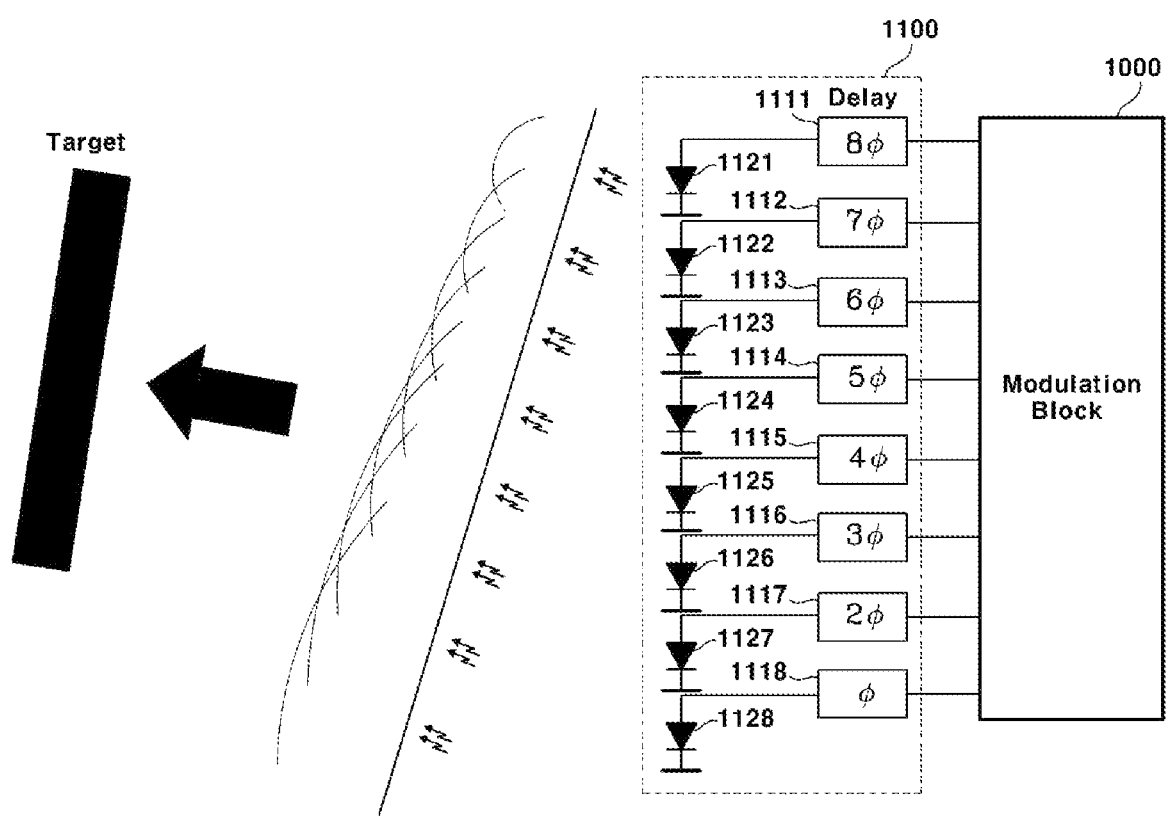
FIG. 7 is a diagram illustrating an example in which a processor according to an embodiment determines a direction of light to be right direction and outputs light.

FIG. 7 is a diagram illustrating an example in which a processor 1000 according to an embodiment determines the direction of light to be right direction and outputs light.

The processor 1000 according to an embodiment determines the delay time of light outputted from light sources located in the second region of the light sources to be smaller than the delay time of light outputted from light sources located in the first region among the light sources, so that the direction may be determined to be the direction in which the first region is located.

Referring to FIG. 7, the processor 1000 may determine the direction of light to be right direction based on the direction of light output by determining the delay time in a way that among the plurality of light emitting diodes 1121 to 1128, the delay time of the light emitted from the light emitting diode located on the left side based on the light output direction is determined to be smaller than the delay time of the light emitted from the light emitting diode located on the right side (upper side in the drawing) based on the light output direction.

FIG. 8 is a diagram illustrating an example in which a light source array according to an embodiment outputs light so that energy is concentrated in a central region on a 2D area of 4*4 pixels.

Referring to FIG. 8, the processor 1000 may determine the direction of light to be central (center) direction by determining the delay time in a way that among the plurality of light emitting diodes 1121 to 1128, the delay time of the light outputted from the light emitting diodes 1131 located at the peripheral region is larger than the delay time of light outputted from the light emitting diodes 1132 located in the central region FIG. 9 is a diagram illustrating an example in which a light source array 1100 according to an embodiment outputs light so that energy is concentrated in a central region on a 2D area of 5*5 pixels.

Referring to FIG. 9, the processor 1000 may determine the direction of light to be central (center) direction by determining the delay time in a way that among the plurality of light emitting diodes 1141, 1142, and 1143, the time delay of the light outputted from the light emitting diode 1143 located at the most central region is 0, the time delay of the light outputted from the second light emitting diodes 1142 located at the central region is 3ø, and the time delay of the light outputted from the light emitting diodes 1141 located at the peripheral region is 5ø.

FIGS. 8 and 9 respectively disclose the case of 4*4 pixels and 5*5 pixels, but are not limited thereto.

Figure 10:
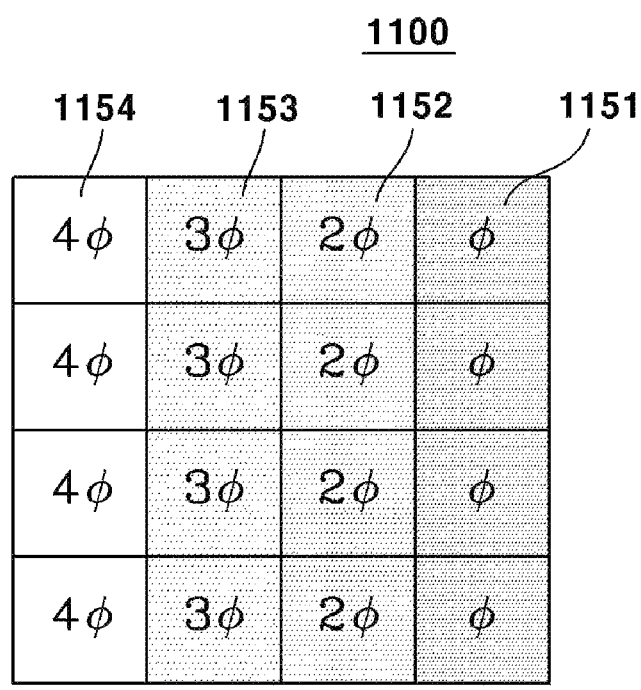
FIG. 10 is a diagram illustrating an example in which a light source array according to an embodiment outputs light so that energy is concentrated in a left side region on a 2D area of 4*4 pixels.

FIG. 10 is a diagram illustrating an example in which a light source array 1100 according to an embodiment outputs light so that energy is concentrated in a left side region on a 2D area of 4*4 pixels.

Referring to FIG. 10, the processor 1000 may determine the direction of light to be left direction by determining the delay time in a way that among the plurality of light emitting diodes 1151, 1152, 1153, and 1154, the time delay of light outputted from the light emitting diode 1151 located at the most right side is 0, the time delay of the light outputted from the light emitting diode 1152 located at the second right side is 2ø, the time delay of the light outputted from the light emitting diode 1153 located at the third right side is 3ø, and the time delay of the light outputted from the light emitting diodes 1154 located at the most left side is 4ø.

Figure 11:
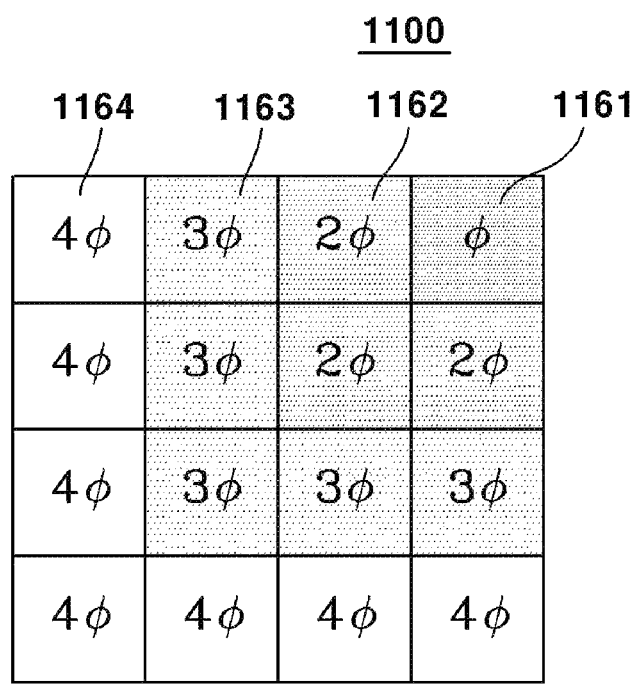
FIG. 11 is a diagram illustrating an example in which a light source array according to an embodiment outputs light so that energy is concentrated in a lower left region on a 2D area of 4*4 pixels.

FIG. 11 is a diagram illustrating an example in which a light source array 1100 according to an embodiment outputs light so that energy is concentrated in a lower left region on a 2D area of 4*4 pixels.

Referring to FIG. 11, the processor 1000 may determine the direction of light to be lower left direction by determining the delay time in a way that among the plurality of light emitting diodes 1161, 1162, 1163, and 1164, the time delay of the light outputted from the light emitting diode 1161 located at the most upper right end is ø, the time delay of the light outputted from the light emitting diode 1162 located on the second upper right end is 2ø, the time delay of the light outputted from the light emitting diode 1163 located on the third upper right end is 3ø, and the time delay of the light outputted from the light emitting diodes 1164 located at other locations is 4ø.

As can be seen in FIGS. 4 to 11, when light is outputted toward the central direction, the output light is directed toward the region having a small delay time, but when the light is offset toward the right or left, the output light may be directed toward the region with large delay time.

Figure 12:
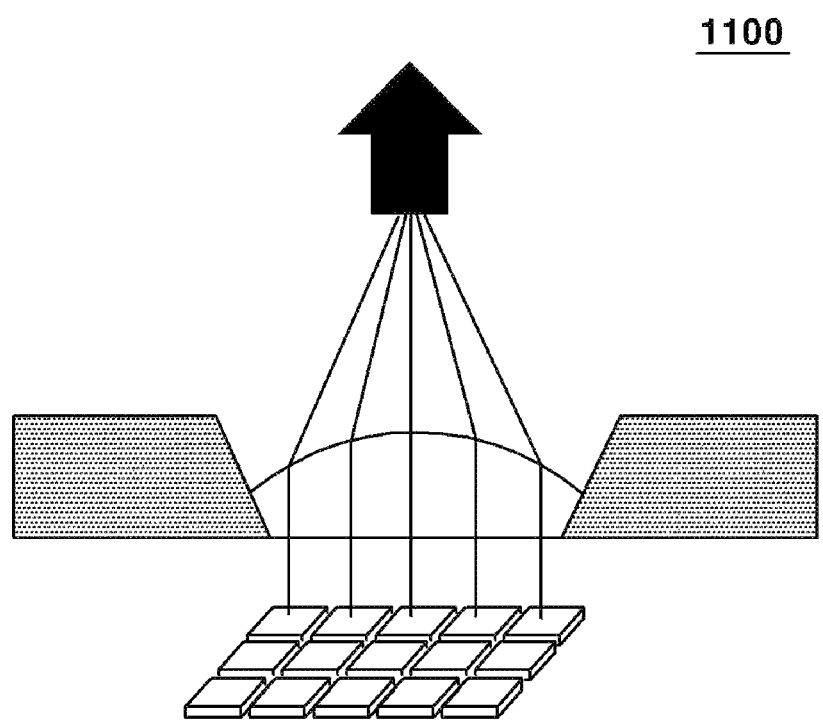
FIG. 12 is a diagram illustrating an example in which a processor according to an embodiment controls a liquid lens to concentrate energy of output light in the central region.
Figure 13:
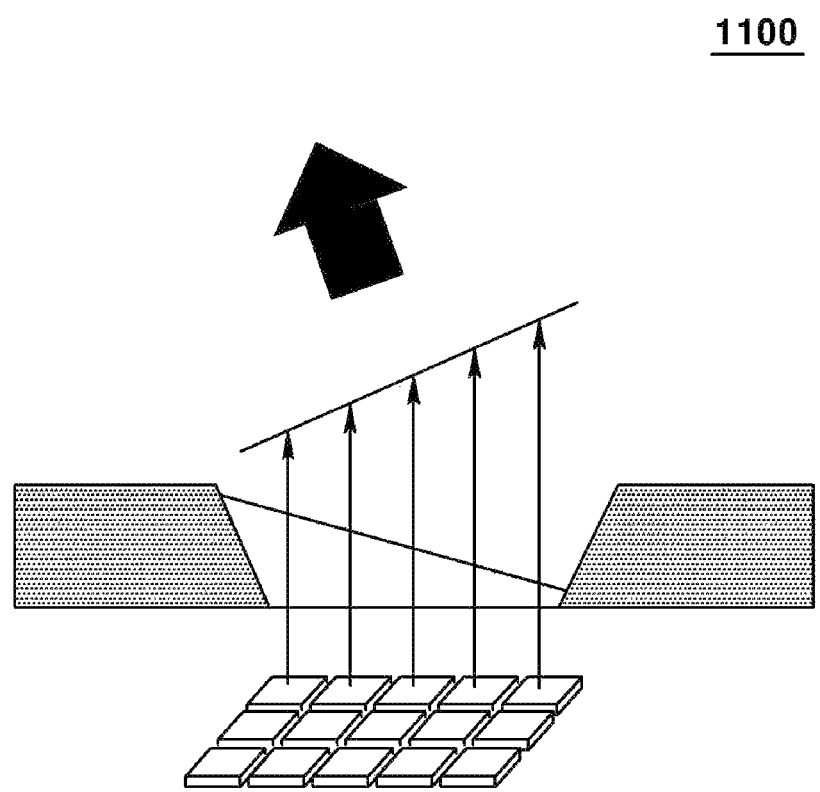
FIG. 13 is a diagram illustrating an example in which a processor according to an embodiment controls a liquid lens to determine the direction of output light toward the left side.
Figure 14:
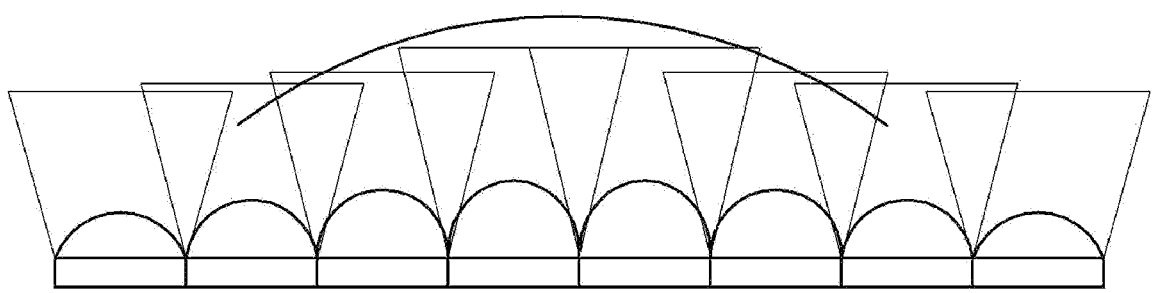
FIG. 14 is a diagram illustrating an example in which a processor according to an embodiment controls a plurality of liquid lenses to determine the traveling direction of light outputted from a light source array.

FIGS. 12 to 14 are diagrams illustrating an example of determining a direction of light output using a liquid lens.

Specifically, referring to FIG. 12, the processor 1000 according to an embodiment may control the liquid lens to concentrate energy of outputted light toward the central region. Further, referring to FIG. 13, the processor 1000 according to an embodiment may control a liquid lens to determine a direction of outputted light toward the left side. In addition, referring to FIG. 14, the processor 1000 according to an embodiment may control a plurality of liquid lenses to determine a traveling direction of light outputted from the light source array 1100.

Figure 15:
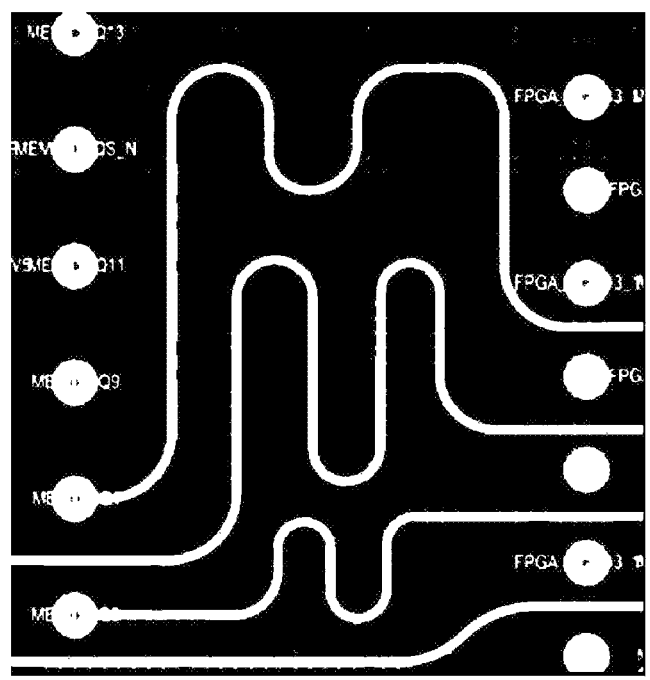
FIG. 15 is a diagram illustrating an example in which the traveling direction of output light is determined in consideration of a wiring length according to an embodiment.

FIG. 15 is a diagram illustrating an example in which the traveling direction of output light is determined in consideration of a wiring length according to an embodiment.

The time taken by the signal to be delivered may vary depending on the length of the wire. If the length of the wiring is long, the time taken by the signal to be delivered is long, and if the length of the wiring is short, the taken by the signal to be delivered may be short. Accordingly, when determining the delay time of light outputted from each light source, the processor 1000 may determine in consideration of the length of the wires for each light source. For example, when a signal is transmitted with the same delay time, when the length of the wiring is predetermined so that light is outputted with energy concentrated in the central region, the processor 1000 may determine delay time of light outputted from each light source in consideration of the initial state of the length of the wiring.

Figure 16:
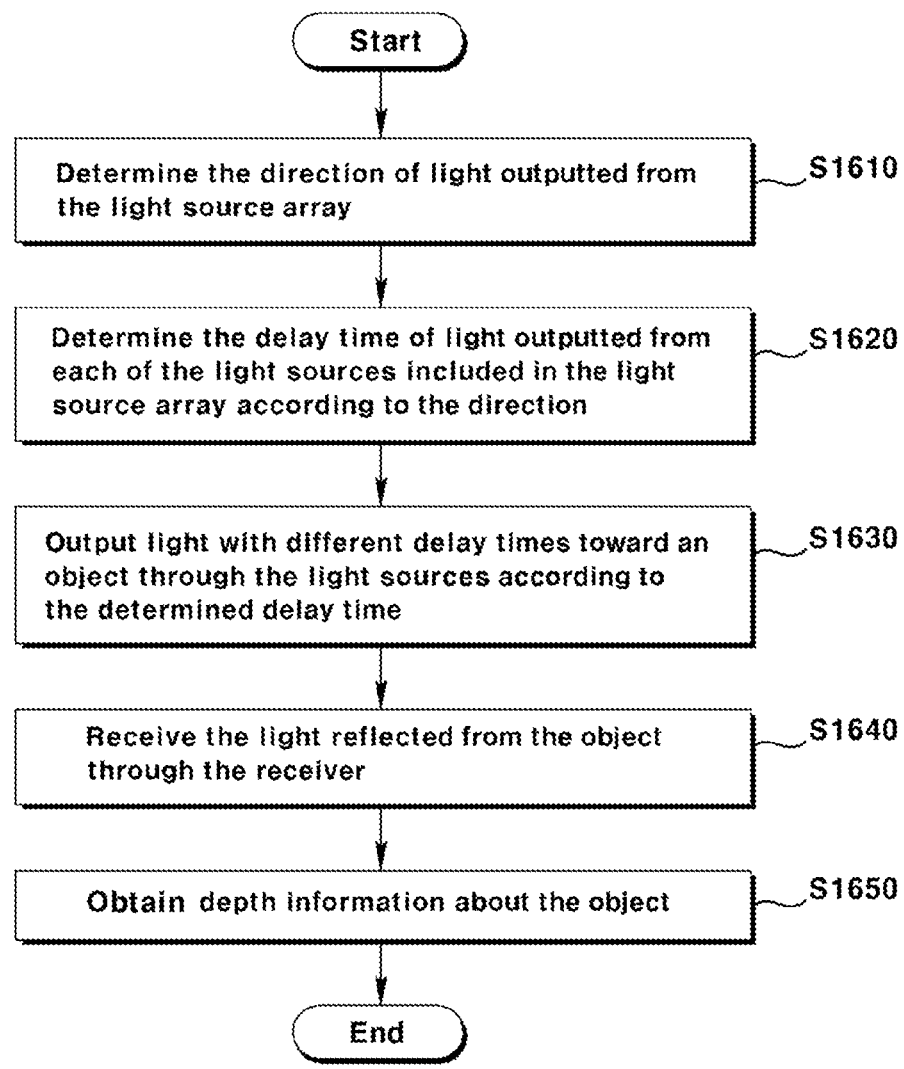
FIG. 16 is a flowchart illustrating a method for obtaining depth information on an object by a camera module according to an embodiment.

FIG. 16 is a flowchart illustrating a method for obtaining depth information on an object by a camera module 100 according to an embodiment.

In step S1610, the camera module 100 according to an exemplary embodiment determines a direction of light outputted from the light source array 1100. At this time, the camera module 100 may determine the direction of light outputted from the light source array 1100 according to a user input, or the camera module 100 may determine the direction of light outputted from the light source array 1100 or an energy concentration region of light outputted from the light source array 1100 according to the distance between the object 130 and the light source array 1100, the direction in which the object 130 is located with respect to the light source array 1100, and the like.

In step S1620, the camera module 100 according to an embodiment determines the delay time of light outputted from each of the light sources included in the light source array 1100 according to the direction determined in step S1610, and in step S1630, the camera module 100 according to an embodiment outputs light having different delay times through the light sources toward the object 130 according to the delay time determined in step S1620.

In step S1640, the camera module 100 according to an embodiment receives the light reflected from the object 130 through the receiver 120, and in step S1650, the camera module 100 according to an embodiment obtains depth information on the object 130. For example, the camera module 100 may obtain depth information on the object 120 by using a phase difference between the light outputted from the light source array 1100 and the light received by the receiver 120. As another example, the camera module 100 may obtain depth information on the object 130 by using a difference the time point at which the light source array 1100 outputs light and the time point at which the receiver 120 receives the light.

Meanwhile, the above-described method can be written as a program that can be executed on a computer, and can be implemented in a general-purpose digital computer that operates the program using a computer-readable recording medium. In addition, the structure of the data used in the above method can be recorded on a computer-readable recording medium through various means. The recording medium that can be read with the above described computer includes a storage medium such as a magnetic storage medium (e.g., ROM, RAM, USB, floppy disk, hard disk, etc.), and an optical reading medium (e.g., CD-ROM, DVD, etc.).

The embodiments of the present invention have been described above with reference to the accompanying drawings, but a person skilled in the art to which the present invention belongs may understand that the present invention can be implemented in other specific forms without changing the technical idea or essential features. Therefore, it should be understood that the embodiments described above are illustrative and non-limiting in all respects.

The invention claimed is:

1. A camera module comprising:
   a light source array for outputting light to an object through light sources;
   a receiver for receiving light reflected from the object; and
   a processor that obtains depth information on the object by using a phase difference between the light outputted from the light source array and the light received by the receiver,
   wherein the processor controls a delay time of light outputted from each of the light sources, so that a directing direction of light outputted through the light sources is determined, and
   wherein the processor determines a distance from the light source array to the object, and, when the distance is less than or equal to a preset value, the processor determines delay time of light outputted from each of the light sources to be same.

2. The camera module according to claim 1, wherein the processor determines a delay time of light outputted from light sources located in a central region of the light sources to be smaller than a delay time of light outputted from light sources located in a peripheral region of the light sources, so that the directing direction of light is determined to be directing toward a central direction.

3. The camera module according to claim 1, wherein the processor determines a delay time of light outputted from light sources located in a second region of the light sources to be smaller than a delay time of light outputted from light sources located in a first region of the light sources, so that the directing direction of light is determined to be directing toward a direction in which the first region is located.

4. The camera module according to claim 1, wherein, when the distance exceeds the preset value, the processor determines delay time of light outputted from each of the light sources to be different.

5. The camera module according to claim 1, wherein the processor determines the delay time according to a wiring length of each of the light sources.

6. The camera module according to claim 1, wherein the light source array outputs light by performing amplitude modulation or phase modulation according to a control signal received form the processor.

7. The camera module according to claim 1, wherein the light outputted from the light source array has a form of a periodic continuous function having a preset period.

8. The camera module according to claim 7, wherein the light sources output light of different intensities, different frequencies, different phases, and different delay times from each other.

9. The camera module according to claim 1, wherein each of the light sources output light independently.

10. A camera module comprising:
 a light source array for outputting light to an object through light sources;
 a receiver for receiving light reflected from the object; and
 a processor that obtains depth information on the object by using a difference between a time point at which the light source array outputs light and a time point at which the receiver receives the light,
 wherein the processor determines a directing direction of light outputted through the light sources by controlling a delay time of light outputted from each of the light sources, and
 wherein the processor determines a distance from the light source array to the object, and, when the distance is less than or equal to a preset value, the processor determines delay time of light outputted from each of the light sources to be same.

11. The camera module according to claim 10, wherein the processor determines a delay time of light outputted from light sources located in a central region of the light sources to be smaller than a delay time of light outputted from light sources located in a peripheral region of the light sources, so that the directing direction of light is determined to be directing toward a central direction.

12. The camera module according to claim 10, wherein the processor determines a delay time of light outputted from light sources located in a second region of the light sources to be smaller than a delay time of light outputted from light sources located in a first region of the light sources, so that the directing direction of light is determined to be directing toward a direction in which the first region is located.

13. The camera module according to claim 10, wherein, when the distance exceeds the preset value, the processor determines delay time of light outputted from each of the light sources to be different.

14. A method for obtaining depth information comprising:
 determining a directing direction of light outputted from a light source array;
 determining a delay time of light outputted from each of a plurality of light sources included in the light source array according to the directing direction;
 outputting light having different delay times toward an object through the light sources according to the determined delay time;
 receiving light reflected from the object through a receiver;
 obtaining depth information on the object by using a phase difference between the light outputted from the light source array and the light received by the receiver or by using a difference between a time point at which the light source array outputs light and a time point at which the receiver receives the light,
 determining a distance from the light source array to the object; and
 determining delay time of light outputted from each of the plurality of light sources to be same, when the distance is less than or equal to a preset value.

15. The method for obtaining depth information according to claim 14, wherein a delay time of light outputted from light sources located in a central region of the light sources is determined to be smaller than a delay time of light outputted from light sources located in a peripheral region of the light sources, so that the directing direction of light is determined to be directing toward a central direction.

16. The method for obtaining depth information according to claim 14, wherein a delay time of light outputted from light sources located in a second region of the light sources is determined to be smaller than a delay time of light outputted from light sources located in a first region of the light sources, so that the directing direction of light is determined to be directing toward a direction in which the first region is located.

17. The method for obtaining depth information according to claim 14, further comprising determining delay time of light outputted from each of the plurality of light sources to be different, when the distance exceeds the preset value.

* * * * *